Figure 7:
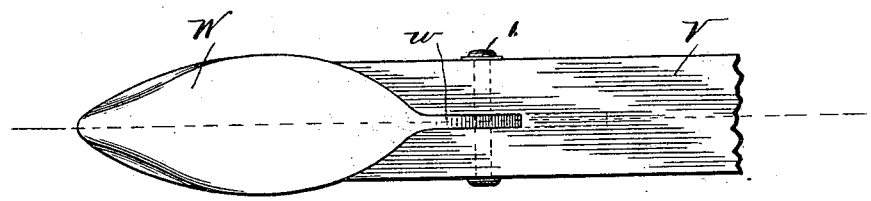

(No Model.) 2 Sheets—Sheet 1.
D. F. OLIVER.
HAY RAKE.
No. 455,004. Patented June 30, 1891.
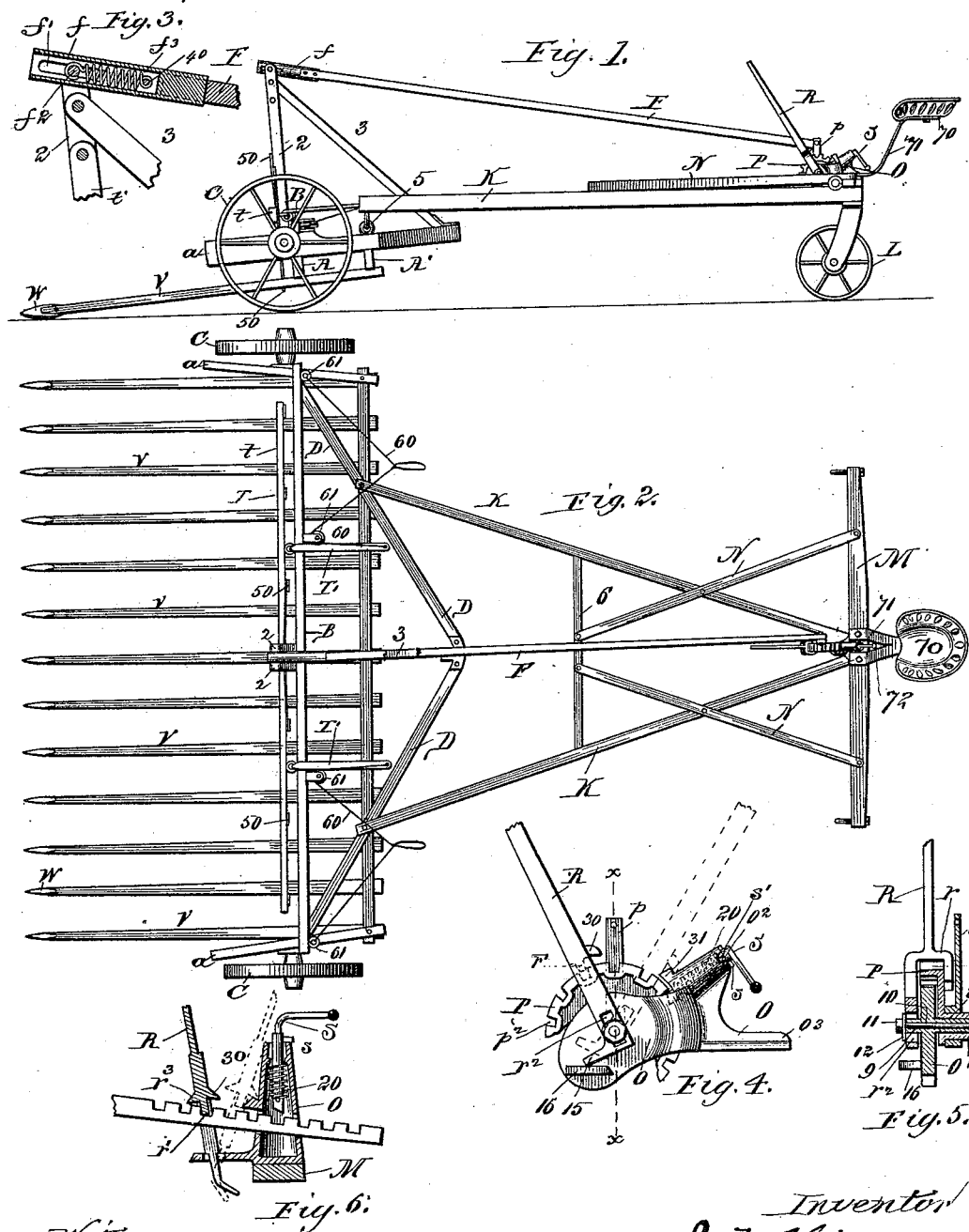
Witnesses
W. Rossiter
J. B. Carpenter
Inventor
D. F. Oliver
By Prim & Fisher
Attys (No Model.) 2 Sheets—Sheet 2.

D. F. OLIVER.
HAY RAKE.

No. 455,004. Patented June 30, 1891.

UNITED STATES PATENT OFFICE.

DOCTOR FRANKLIN OLIVER, OF SAN FRANCISCO, CALIFORNIA, ASSIGNOR TO THE ACME HARVESTER COMPANY, OF PEORIA, ILLINOIS.

HAY-RAKE.

SPECIFICATION forming part of Letters Patent No. 455,004, dated June 30, 1891.

Application filed February 6, 1890. Serial No. 339,441. (No model.)

*To all whom it may concern:*

Be it known that I, DOCTOR FRANKLIN OLIVER, a citizen of the United States, residing at San Francisco, in the State of California, have invented certain new and useful Improvements in Hay-Rakes, of which I do declare the following to be a full, clear, and exact description, reference being had to the accompanying drawings, forming part of this specification.

My present invention has relation more particularly to that class of rakes commonly known as "sweep-rakes," in which the gathering of the hay is effected by means of long teeth projecting forwardly from a rake-head, and in which there is connected to the rear of the rake-head a seat-frame for the driver.

One object of my present invention is to provide an improved construction of metal points for the rake teeth. While it has been heretofore proposed to provide the teeth of the rake with metal points, a difficulty experienced with such points has been that as the portion of the wooden teeth adjacent the metal points became worn after long usage the rear portions of the metal points formed shoulders which were apt to catch into the hay and to prevent easy withdrawal of the rake from beneath its load. To avoid this difficulty I provide an improved metal point having a fin that shall extend beneath the surface of the wooden tooth, so that even when the wooden tooth becomes worn adjacent the rear portion of the metal point the metal point will not present any shoulders that will serve to catch the hay or prevent the ready withdrawal of the teeth beneath the load.

In the accompanying drawings my improvements are illustrated as embodied in that type of rake in which the movement of the rake is effected by horses hitched to the driver's frame at the rear of the rake-head, although it will be readily understood that various features of the invention are applicable to other types of sweep-rake. An example of this type of rake is illustrated in Letters Patent No. 330,727, granted to me November 17, 1885.

In the Letters Patent referred to above, and in Letters Patent No. 373,902, granted to me November 29, 1887, I have shown improvements whereby the raising and lowering of the rake-teeth may be controlled by an operating-lever sustained upon the seat-frame adjacent the driver's seat, this lever being provided with a pawl that served to engage with the rack-bar at the end of the shifting-bar.

A further object of my invention is to provide improved means whereby the movement of the shifting-bar can be secured in order to effect the raising and lowering of the points of the rake-teeth, and this object I have accomplished by the novel construction of mechanism hereinafter described, and particularly defined in the claims at the end of this specification.

In the operation of hay-rakes of the type above described, in which the rake-head is pivotally connected to a rearwardly-extending seat-frame, it is found in practice that when the points of the rake-teeth have been depressed against the ground by the movement of the operating-lever adjacent the seat-frame there is a tendency, when the teeth are traveling over rough or uneven ground, to lift the wheels that sustain the rake-head off the ground, thereby throwing a severe strain not only upon the rake-teeth, but also upon the shifting-bar that connects the rake-head with the rear of the seat-frame. So, also, when a rake has received its load and the points of the rake-teeth have been lifted from off the ground in order to permit the rapid travel of the rake to the stacker or other point for discharging its load, there is a tendency of the rake-teeth to vibrate if the ground be at all rough or uneven, thereby throwing a constant and severe sudden strain upon the shifting-bar and the upright or standard that connects this bar with the rake-head.

A still further object of my invention is to overcome the objections last noted, and this object I have accomplished by providing a spring cushion or action between the shifting-bar and the rake-head, so that the shifting-bar may be relieved in great measure from any sudden strain thrown upon the rake-teeth.

Figure 8:
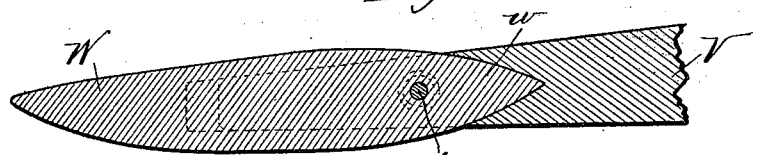
Figure 9:
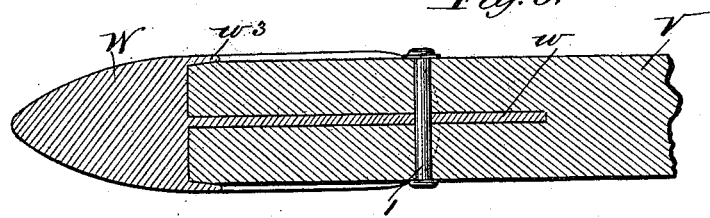
Figure 10:
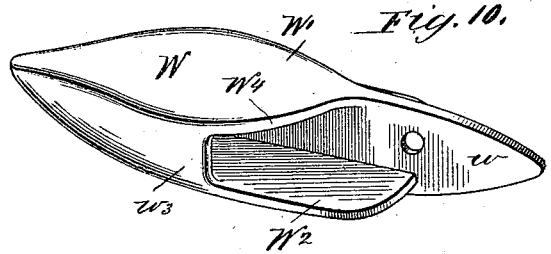

Figure 1 is a view in side elevation of a rake embodying my invention. Fig. 2 is a plan view. Fig. 3 is an enlarged detail view in vertical section showing the spring-coupling that unites the connecting-bar with the bracket of the rake-head. Fig. 4 is an enlarged detail view in side elevation, showing the ratchet-wheel and adjacent parts. Fig. 5 is a view in vertical cross-section on line $x$ $x$ of Fig. 4. Fig. 6 is an enlarged detail view in vertical section, showing the modified form of rack at the end of the connecting-bar. Fig. 7 is a plan view of one of the rake-teeth, showing the metal point at its end. Fig. 8 is a view in central vertical longitudinal section. Fig. 9 is a view in central horizontal section through Fig. 8. Fig. 10 is a detail perspective view of the metal tooth-point.

The rake-head, which may be of any usual or suitable construction, is shown in the accompanying drawings as formed of the longitudinal bars A, A', and B, and at the ends of these bars are provided suitable head-blocks $a$, carrying wheels C, that serve to sustain the rake-head. The teeth V, which project forwardly from the rake-head, are provided with metal points W. Each of these points consists of a casting having a central rib $w$, that will be inserted within a suitable slot cut in the end of the wooden tooth, and each of these points is provided with the upper plate W' and the lower plate $W^2$, which, with the central rib or web $w$, serve to form a seat or socket to receive the divided ends of the wooden tooth. By preference, also, the casting is formed with the side plates $W^3$ at the base of the sockets, in order to better protect the ends of the teeth. The central rib or web $w$ has its edges curved or inclined toward the central point of the teeth—that is to say, the edges are curved to a point at least beneath the surface of the wood, so that as the wood becomes worn adjacent the rear portion of the teeth the curved or inclined edge of the web or rib $w$ will prevent the lodgment of any hay. For this reason, also, the rear edges $W^4$ of the upper plate W' are inclined or curved in backward direction, and in like manner, also, the rear edges of the plate $W^2$ are by preference curved. The central web or rib $w$ will be provided with a suitable hole or holes, through which will pass rivets 1, that serve to firmly bolt the metal point to the end of the wooden tooth.

To the bars A and A' are connected the brace-bars D, that extend obliquely in backward direction, and are united together at a point behind the rake-head, as shown. To the bars A and B are fastened the upright bars 2, and from the upper portion of these bars 2 to the point of union of the bars D extends the brace-bar 3. By preference, also, an additional brace-bar (not shown) is extended from the base of the vertical bars to junction of the bars D. The vertical bars 2 serve as a standard, to which is pivotally connected, as will hereinafter more fully be described, the front end of the shifting-bar F, by means of which the raising and lowering of the points of the rake-teeth is effected. To the rear portion of the rake-head is pivotally attached, as at 5, the front ends of the bars K of the seat-frame, these bars being brought together at their rear ends and being there provided with a caster-wheel L, whereby the rear end of the seat-frame will be sustained. The bars K are braced, as shown, by the cross-bar 6, and across the abutting ends of these bars K extends the draft-bar M, to the ends of which the singletrees of the horses will be attached. From the draft-bar M extends in forward and inward direction the oblique brace-bars N, that are bolted to the draft-bars, to the bars K and to the cross-bar 6. By thus constructing the seat-frame I am enabled not only to afford a much more secure seat for the driver, but also to guard against the racking of the frame and its connections by the uneven movement of the draft-horses, since the oblique bars N, connected, as they are, to the draft-bar and to the cross-bar 6, serve to distribute the strain of the draft, and serve, also, to relieve the seat-frame from any racking action incident to the movement of the driver.

In order to effect the raising and lowering of the rake-teeth points, I have devised the improved construction of mechanism next to be described. From the rear of the seat-frame rises the standard O, that is bolted to the draft-bar M, and is provided with a forward extension $o$, that is formed with the bosses 8 and 9, by preference formed in piece therewith. The boss 8 serves as a journal pin or bearing whereon is set a segmental rack-bar or ratchet-wheel P, and the boss 9 serves as a support or bearing for the operating-lever R, as will hereinafter more fully appear. To the side of the ratchet-wheel P is attached the arm $p$, to the end of which is pivotally connected the rear end of the shifting-bar F, and by preference the ratchet-wheel P is provided with an extended hub $p'$, in order to give it a broad bearing upon the boss 8 of the extension $o$ of the standard O. By preference the bosses 8 and 9 are cast with the center pin 10, having threaded ends to receive the correspondingly-threaded nuts 11, which serve to hold in place the washers 12, by means of which the ratchet-wheel P and the operating-lever R are held upon their respective bosses. The operating-lever R is preferably formed with an overhanging arm or extension $r$, that depends upon the side of the ratchet-wheel P opposite that upon which the operating-lever is held, and serves to hold the lever securely in position with respect to the wheel. The ratchet-wheel P is provided upon its rim with a series of notches $p^2$, with which will engage a pawl $r'$, that projects inwardly from that portion of the operating-lever above the rim of the ratchet-wheel. The operating-lever R is formed at its lower end with a short slot $r^2$, which permits this lever to be raised and lowered in order to enable the pawl $r'$ to engage the notches $p^2$ of the ratchet-wheel P and to be lifted therefrom. The lower end of the operating-lever R is also furnished with a discharge-foot 15, adapted to contact with a lug or projection 16, that extends outwardly from the side of the extension o of the standard O, the purpose of this foot 15 and projection 16 being to enable the lever to be automatically disengaged from the ratchet-wheel, as will presently more fully appear. In the upper portion of the standard O is formed a chamber or socket adapted to receive a check-pawl S, that is pressed normally into engagement with the notches of the ratchet-wheel P by means of a suitable coiled spring 20, this pawl S being furnished with a shifting-arm s, adapted to enter the seat s', formed in the edge of the socket or chamber $o^2$ of the standard O, in order to permit the end of the pawl to enter the notches of the ratchet-wheel P. When, however, the pawl is lifted out of engagement with the ratchet-wheel and its arm s is swung to one side of the seat s', the bearing of the arm s against the edge of the chamber $o^2$ will hold the pawl out of engagement with the notches of the ratchet-wheel.

From the foregoing description it will be seen that when it is desired to elevate the points of the rake-teeth it is only necessary to lift the operating-lever R and move it forward, so that its pawl r' shall engage with one of the forward notches $p^2$ of the ratchet-wheel P, when by drawing backward the operating-lever the ratchet-wheel will be caused to revolve, carrying with it the arm or extension p, and consequently moving backward the shifting-bar F in such manner as to cause this bar to tilt the rake-head about its journals, and hence lift the points of the rake-teeth off the ground. As the inner end of the check-pawl S is beveled, as shown, it will permit the movement of the ratchet-wheel beneath it in backward direction, but will check the forward movement of the ratchet-wheel when the operating-lever is lifted to enable the lever to be swung forward to again move this wheel in backward direction. When, however, it is desired to permit the points of the rake-teeth to bear upon the ground, it is only necessary to withdraw the check-pawl S from engagement with the ratchet-wheel by means of the arms s, thereby permitting the weight of the rake-teeth, through the shifting-bar F, to move forward the ratchet-wheel, carrying with it the operating-lever, until the foot 15 strikes the leg or projection 16, thereby causing the operating-lever to be lifted until the pawl r' passes out of engagement with the notches of the ratchet-wheel. By thus sustaining the operating-lever so that it can be freely lifted and by providing this lever with a fixed pawl I am enabled to make a much cheaper and simpler construction than would be possible if the operating-lever were incapable of vertical movement or provided with a separate spring-actuated pawl. By preference the rear edge of the operating-lever is provided with a catch-lug 30, engaged with a lug 31, formed at the top of the main standard O, in order to hold the operating-lever out of engagement with the ratchet-wheel, so that when the teeth of the rake are riding freely over the ground and the shifting-bar and ratchet-wheel are constantly moving more or less, by reason of the unevenness of the ground, the operating-lever will remain out of action, but within convenient reach of the driver.

In the modified form of the invention illustrated in Fig. 6 of the drawings I have shown one feature of my invention as applied in connection with a shifting-bar having a straight rack-bar at its end, as in my patent, No. 373,902, hereinbefore referred to, and in this modified form of the invention the operating-lever R is sustained in a manner permitting it to move freely in vertical direction, and is provided, also, with a fixed pawl r', formed, preferably, in piece therewith, which serves to engage with the notches of the rack-bar at the rear end of the shifting-bar F. In this construction the operating-lever is provided with a throw-off foot $r^3$, which, as the shifting-bar F is moved forward, carrying with it the operating-lever, will serve to engage with the upper edge of the rack-bar and cause the pawl of the operating-lever to be lifted out of engagement therewith. The shifting-bar F is provided at its forward end with a coupling f, that is furnished with slots f' to receive the pivot-bolt $f^2$, whereby the end of the shifting-bar is connected with the upper ends of the standards 2. This coupling f is formed with a chamber adapted to receive a strong coiled spring $f^3$, one end of which spring is attached, as at 40, to the base of the chamber, while the opposite end of the spring encircles the pivot-bolt $f^2$ or a suitable sleeve formed upon the central portion of this pivot-bolt. In the arrangement shown the coiled spring $f^3$ serves both as a traction and compression spring, so that it will relieve the shifting-bar and the uprights or standards 2 from sudden strain, whether such strain be incident to the downward or upward movement of the rake-teeth. In other words, if the points of the rake-teeth be suddenly depressed in passing over uneven ground, the swinging forward of the upper ends of the standards 2 will be resisted in a measure by the pulling action of the coiled spring, whereas if the points of the rake-teeth be forced suddenly upward the coiled spring will serve as a cushion to relieve the uprights 2 and the shifting-bar F from sudden strain.

In the accompanying drawings I have illustrated the rake-head as provided with a discharge-frame T, consisting of a transverse main bar t, having vertical teeth 50, that project upwardly from the main bar and also downwardly to a point between the main teeth of the rake. This discharge-frame T is pivotally sustained by a suitable bar t', Fig. 3, the upper end of which passes between the uprights 2 at a slight distance from their top, and is there held by a suitable pivot-bolt. To the main bar T are connected push-bars T', from the inner ends of which extend suitable cords 60, that pass around the pulleys 61, that are attached to the rear side of the transverse bar B of the rake-head, the opposite ends of these cords 60 being attached, as at 61, to the ends of the rake-head. The cords 60 will each be provided with a suitable loop or eye for the attachment thereto of the breast-strap of the draft-horses. From this construction it will be seen that when it is desired to discharge the load of hay from the rake it is only necessary to back the horses, the initial backing movement of the horses serving to draw backwardly the cords 60, thereby causing the push-bars T' to force forward the discharge-frame and start the load from off the teeth. As the backward movement of the horses is continued, the rake will be withdrawn from beneath its load, the discharge-frame serving to prevent any lodgment of the hay at the rear ends of the teeth, as would be apt to occur if no such discharge-frame were employed.

It will be observed that the driver's seat 70 is sustained by means of springs 71 and 72, which are supported at their base, and are bolted one upon each side of the standard O, between which springs will extend the rear rib $o^3$ of the standard O. In the construction shown in Figs. 2 and 4 of the drawings this rear rib of the standard O serves to hold the springs 71 and 72 against lateral movement, and in the modified construction shown in Fig. 6 the standard O serves to guard the springs against lateral movement, while the open space between the springs allows the rack-bar attached to the rear end of the shifting-bar to be freely moved in backward direction.

It will be readily understood that the precise details of construction above set out may be varied by a skilled mechanic without departing from the spirit of the invention, and that features of the invention may be employed in connection with other styles of rake than that illustrated in the accompanying drawings.

Having thus described my invention, what I claim as new, and desire to secure by Letters Patent, is—

1. A metal tooth-point provided with a web or fin adapted to project below the surface of the wooden tooth and having inclined edges, substantially as described.

2. A metal tooth-point provided with a central web or fin and side sockets for the divided end of the wooden tooth, substantially as described.

3. A metal tooth-point having a central web or fin $w$, with rearwardly-inclined edges, and having the seats or sockets $w'$ and $w^2$, the plates $w^3$ and $w^4$, having rearwardly inclined or curved edges, substantially as described.

4. The combination, with a rake-head and the seat-frame at the rear thereof, of a shifting-bar for controlling the movements of the rake-teeth, a ratchet-wheel connected to said shifting-bar, and a suitable operating-lever for engagement with said ratchet-wheel, substantially as described.

5. The combination, with a rake-head and a seat-frame connected thereto at its rear, of a shifting-bar suitably connected with said rake-head for controlling the movements of the rake-teeth, a ratchet-wheel connected with said shifting-bar, an operating-lever for effecting the movement of said ratchet-wheel, and a check-pawl for engagement with said ratchet-wheel, substantially as described.

6. The combination, with a rake-head and a seat-frame attached thereto at its rear, of a shifting-bar suitably connected with said rake-head, a ratchet-wheel connected with said shifting-bar, and an operating-lever for effecting the movement of said ratchet-wheel, said operating-lever being provided with a fixed pawl and being mounted in a manner permitting it to move in vertical direction, substantially as described.

7. The combination, with a rake-head and a seat-frame attached thereto at its rear, of a shifting-bar and a suitable rack connected with said shifting-bar, and an operating-lever for effecting the movement of said shifting-bar, said operating-lever being provided with a fixed pawl formed rigidly therewith and being mounted in a manner permitting it to move in vertical direction, substantially as described.

8. The combination, with a rake-head and a seat-frame attached thereto at its rear, of a shifting-bar suitably connected with said rake-head, a rack connected with said shifting-bar, an operating-lever for effecting the movement of said shifting-bar provided with a fixed pawl formed rigidly therewith, said operating-lever being mounted in manner permitting it to move in vertical direction, and a throw-off foot connected to said operating-lever, substantially as described.

9. The combination, with a rake-head and a seat-frame attached thereto at its rear, of a shifting-bar suitably connected with said rake-head, a ratchet-wheel connected with the rear end of said shifting-bar, an operating-lever for effecting the movement of said ratchet-wheel, the main standard for sustaining said ratchet-wheel and said operating-lever, and a check-pawl also sustained by said main standard in position to engage said ratchet-wheel, substantially as described.

10. In rakes of the class described, the combination, with a rake-head having forwardly-projecting teeth adapted to be elevated and depressed, and a seat-frame suitably connected to said rake-head, of a shifting-bar, and suitable means for effecting the movement of said shifting-bar, and a spring coupling or cushion intermediate said shifting-bar and its connection with the rake-head, substantially as described.

11. In rakes of the class described, the combination, with a rake-head having forwardly-projecting teeth adapted to be elevated and depressed, and a seat-frame suitably connected to said rake-head, of a suitable upright or standard mounted upon said rake-head, a shifting-bar in pivotal connection with said upright or standard, and a suitable coiled spring intermediate said shifting-bar and said upright or standard to relieve the parts from sudden shock or strain incident to the vibration of the rake-head, substantially as described.

DOCTOR FRANKLIN OLIVER.

Witnesses:
GEO. P. FISHER, Jr.,
JNO. E. KIRK.